United States Patent [19]
Uchida

[11] 3,878,383
[45] Apr. 15, 1975

[54] SYSTEM FOR CONVERTING A RATIO OF TWO SIGNALS INTO A LOGARITHMIC VALUE

[75] Inventor: Kozo Uchida, Tokyo, Japan

[73] Assignee: Iwatsu Electric Co., Ltd., Tokyo, Japan

[22] Filed: Jan. 23, 1973

[21] Appl. No.: 325,995

[30] Foreign Application Priority Data
Feb. 2, 1972   Japan.................................. 47-11328

[52] U.S. Cl............. 235/183; 235/92 NT; 235/197; 328/145
[51] Int. Cl. .......................... G06g 7/18; G06g 7/24
[58] Field of Search... 235/183, 197, 150.53, 151.35; 328/142, 145; 324/99 D

[56] References Cited
UNITED STATES PATENTS

| | | | |
|---|---|---|---|
| 3,506,818 | 4/1970 | Smith | 235/183 |
| 3,649,826 | 3/1972 | Larsson et al. | 235/183 |
| 3,664,744 | 5/1972 | Liston | 324/99 D |
| 3,665,305 | 5/1972 | Petrohilos | 324/99 D |
| 3,676,661 | 7/1972 | Sprowl | 328/145 |
| 3,691,473 | 9/1972 | Boatwright | 328/145 |

FOREIGN PATENTS OR APPLICATIONS
2,019,323   11/1971   Germany .......................... 324/99 D Primary Examiner—Felix D. Gruber
Attorney, Agent, or Firm—Maleson, Kimmelman & Ratner

[57] ABSTRACT

A system for converting a ratio of two input signals into a logarithmic value comprises the steps of charging a capacitor with an electronic charge which is proportional to said first input signal to be compared, discharging through a discharge resistance for discharging the electronic charge on said capacitor, detecting the period of time between the beginning of said discharge of said capacitor and the time when the voltage across said capacitor intersects with the voltage which is proportional to the second input signal to be compared, and integrating the voltage of an electrical power source with said capacitor and said discharge resistance during a period which is proportional to the above-mentioned period thereby determining the logarithmic value of the ratio between said second input signal and said first input signal as the ratio between the integrating voltage and said voltage of said electrical power source.

4 Claims, 11 Drawing Figures

L.S. 1, 2, 3, 4

L.S. 5, 6

INVERTER

NAND GATE

SYSTEM FOR CONVERTING A RATIO OF TWO SIGNALS INTO A LOGARITHMIC VALUE

The present invention relates to a method and apparatus for converting a ratio of two input signals into a logarithmic value.

In the conventional level meter, two means for converting a ratio of two input signals into a logarithmic value are utilized. One means makes use of the logarithmic characteristics of semi-conductor elements, such as diodes or transistors, and the other makes use of the discharge characteristics of a resistor and a capacitor. The former has the drawbacks of temperature variation due to the characteristics of the semiconductor elements, and dispersion due to the characteristics of the composed elements, and consequently precision can not be anticipated. The latter has the drawbacks that it requires resistors and capacitors with a high degree of accuracy in the value of their resistance and capacitance, respectively, and which react with only small variations due to temperature and time. It is very difficult to satisfy these requirements and, therefore, these drawbacks lead to high cost. Further, the required measurement of the discharge time in both of the above-mentioned means requires the technique of highly accurate time measurement, including a crystal oscillator which has high accuracy and low variation with time, and this also is a cause for the high cost of the measuring apparatus.

An object of the present invention is to provide a novel method for converting a ratio of two input signals to a logarithmic value which overcomes the above-mentioned drawbacks.

Another object of the present invention is to provide a novel method for converting an input signal to a logarithmic value which removes the factors which become the causes of errors in measurement, such as variation of the resistor, the capacitor, measuring time, etc., and has high accuracy and can maintain excellent reliability and accuracy over a long period of time.

A further object of the present invention is to provide a method for converting a ratio of two input signals into a logarithmic value which needs no special elements and can realize the conversion simply and with low cost.

Further features and advantages of the present invention will be apparent from the ensuing description with reference to the accompanying drawings to which, however, the scope of the invention is in no way limited.

Figure 1A:
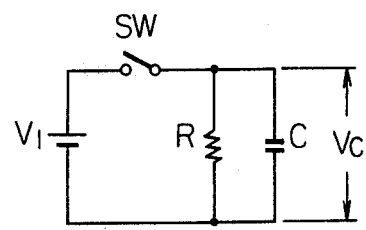
FIGS. 1A and 1B show a principle of one example of the method of converting a ratio of two input signals to a logarithmic value.
Figure 1B:
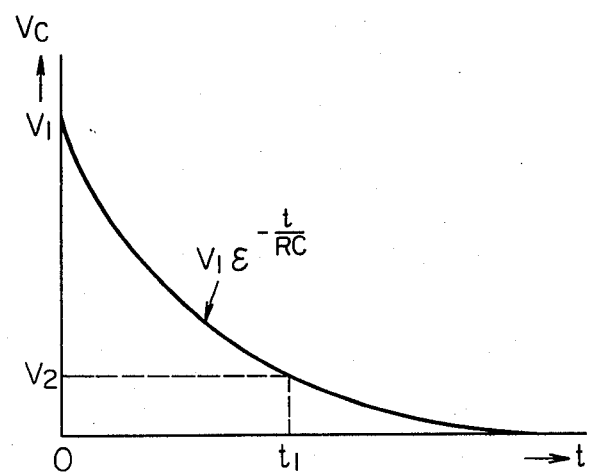

Referring to FIG. 1A, a conventional method for converting a ratio of two input signals to its logarithmic value uses capacitor C and resistor R connected in parallel to each other, a switch SW connected in series with above-mentioned parallel circuit, and an electric source $V_1$ connected between the switch SW and the parallel circuit composed of the capacitor C and the resistor R. We assume that a terminal voltage across capacitor C is $V_c$ when the voltage $V_1$ is supplied via the switch SW to the parallel circuit of the capacitor C and the resistor R. When the switch is on, the electrical source voltage $V_1$ equals the terminal voltage across capacitor C. When the switch SW becomes off in time $t_o$, the terminal voltage $V_c$ across the capacitor C varies with respect to time $t_1$ as shown in FIG. 1B. That is, the terminal voltage $V_c$ is:

$$V_c = V_1 \epsilon - \frac{t}{RC} \qquad (1)$$

Assuming that a voltage to be compared to the voltage $V_1$ is $V_2$, the terminal voltage $V_c$ of the capacitor C intersects with the voltage $V_2$ in time $t_1$ as shown in FIG. 1B. That is:

$$V_2 = V_1 \epsilon - \frac{t_1}{RC} \qquad (2)$$

From Equation 2, the following equation can be obtained.

$$\log \frac{V_2}{V_1} = - \frac{t_1}{RC} \qquad (3)$$

Accordingly, when the resistor R and the capacitor C are selected in suitable values, the time $t_1$ becomes the time which is converted to the logarithmic value. By counting the number of pulses generated in the time $t_1$ by a pulse generator which generates pulses having suitable repetition frequency, the time $t_1$ is obtained as a digital value. One of the problems of such conventional technique is the necessity of the high accuracy of the capacitor C and the resistor R. That is, the values of the capacitor C and the resistor R are required to have no variation with time, temperature and humidity. It is very difficult to satisfy such condition and this results in high cost. Further, a crystal oscillator having high accuracy and no variation with time is necessary for measuring the time $t_1$. This is also a factor which increases the cost of the measuring apparatus.

Figure 2:
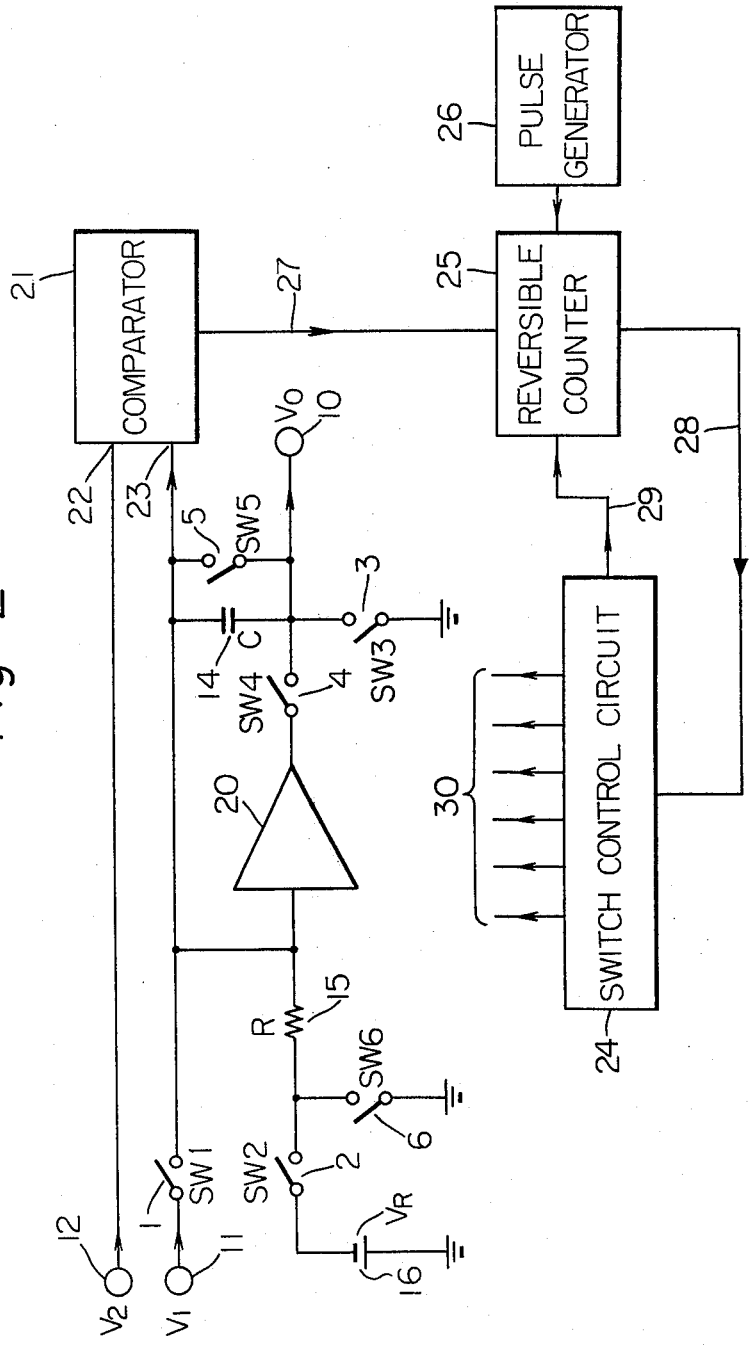
FIG. 2 is a block diagram of one embodiment of a method of converting a ratio of two input signals to a logarithmic value according to the present invention.

FIG. 2 shows one embodiment of the principle according to the present invention. The circuit shown in FIG. 2 comprises a first input terminal 11 to which the first input signal $V_1$ is supplied, a second input terminal 12 to which the second input signal $V_2$ is supplied, a capacitor C14 for charging electric charges proportional to the first signal $V_1$, a discharging circuit including a discharge resistor R15 for discharging the charges on said capacitor C and a reference signal source 16. The discharging circuit is connected to the first input terminal 23 of a comparator 21, the second input signal $V_2$ to be compared is supplied to the second input terminal 22 of the comparator 21. The output of the comparator 21 is supplied to a reversible counter means 25, a pulse generator 26 which generates pulses with predetermined constant period is connected to the reversible counter 25, and the output of the reversible counter 25 is connected to a switch control circuit 24. The information of the switch control circuit 24 is fed back to the reversible counter means 25, a switching means SW$_1$–SW$_6$ or 1–6 is composed of a plurality of switches and is controlled by the output 30 of the switch control circuit 24. Converted logarithmic output $V_o$ is obtained on a terminal 10 and an electric source 16 is a reference voltage $V_R$. The capacitor 14 and resistor 15 define a time constant CR. An amplifier 20 has large gain and the phase of its input and its output are in reverse relation. The comparator 21 has two input terminals 22 and 23, and when two signals which are respectively applied to the terminals 22 and 23, become of equal level, an output signal is sent out to the line 27, and applied to a reversible counter 25. A pulse generator 26 generates a series of pulses with predetermined constant period, and the generated pulses are supplied to the reversible counter 25. The output of the reversible counter 25 controls, via a conductor 28, a switch control circuit 24 whose information is fed back via a conductor means 29 to down count reversible counter 25. A group of switches shown in FIG. 2, that is, switches SW$_1$–SW$_6$, are controlled by the switch control circuit 24. Table 1 shows the time relations of switches SW$_1$–SW$_6$ with regard to each of the periods $T_0$–$T_4$.

Table 1

| SWITCH PERIOD | SW$_1$ | SW$_2$ | SW$_3$ | SW$_4$ | SW$_5$ | SW$_6$ |
|---|---|---|---|---|---|---|
| $T_0$ | ON | OFF | ON | OFF | OFF | ON |
| $T_1$ | OFF | OFF | ON | OFF | OFF | ON |
| $T_2$ | OFF | OFF | OFF | ON | ON | ON |
| $T_3$ | OFF | ON | OFF | ON | OFF | OFF |
| $T_4$ | OFF | OFF | OFF | ON | OFF | ON |

1. Period $T_0$

In the circuit shown in FIG. 2, in the period $T_0$, as shown in Table 1, switches SW$_1$, SW$_3$ and SW$_6$ are on, and the switches SW$_2$, SW$_4$ and SW$_5$ are off. This corresponds to a circuit construction similar to FIG. 1A but where switch SW is on. As a result of this, the terminal voltage $V_C$ across the capacitor C equals to an input signal voltage $V_1$.

2. Period $T_1$

When, in the time $t_o$, the switch SW$_3$ and switch SW$_6$ become on and switches SW$_1$, SW$_2$, SW$_4$, SW$_5$ become off, the voltage $V_C$ across the capacitor C begins the period $T_1$, that is, to discharge with a time constant RC as shown in FIG. 1B and Equation 1. At the same time as the beginning of the period $T_1$, a signal is sent out from the switch control circuit 24 via line 29 to the reversible counter 25, and the counting of the pulses sent from the pulse generator 26 is begun. After the time $t_1$ from beginning the period $T_1$, the voltage $V_C$ supplied to the input terminal 23 of the comparator 21 intersects with the voltage $V_2$. At this time, the comparator 21 sends out the signal via the line 21 to the reversible counter 25, which stops the counting of the pulses from the pulse generator 26. We assume that the number of pulses counted by the reversible counter during the period $T_1$ is $n$.

3. Period $T_2$

In the period $T_2$, switches SW$_4$, SW$_5$ and SW$_6$ become on and switches SW$_1$, SW$_2$ and SW$_3$ become off. During this period, the capacitor 14 is discharged, and the voltage $V_O$ on the output terminal 10 is zero.

4. Period $T_3$

During the period $T_3$, switches SW$_2$ and SW$_4$ become on and switches SW$_1$, SW$_3$, SW$_5$ and SW$_6$ become off. During this period, the capacitor 14, the resistor 15 and the amplifier 20 constitute an integrator having a time constant CR and integrate the output voltage $V_R$ of the electrical power source 16 and the voltage appearing on the terminal 10 increases linearly. At the same time when the period $T_3$ begins, the switch control circuit 24 sends a signal via line 29 to the reversible counter 25 and activates the reversible counter 25. The reversible counter, which contains the number of counts n at the end of the period $T_1$, reversibly counts said number of counts by using the pulses of the pulse generator 26. That is, by using the pulse of the pulse generator 26, the count proceeds from n to zero. Then, when the count becomes zero, the output voltage $V_O$ on the terminal 10 is:

$$V_o = V_R \frac{t_1}{RC} \qquad (4)$$

When the count becomes zero, the reversible counter 25 sends a signal via the line 28 to the switch control circuit 24.

5. Period $T_4$

During the period $T_4$, switches SW$_4$ and SW$_6$ are on and switches SW$_1$, SW$_2$, SW$_3$ and SW$_5$ are off. In this state the voltage $V_O$ is maintained at the value shown by the Equation 4. That is, during the period $T_4$, the voltage $V_O$ shown in the Equation 4 is held.

The relation between the voltages $V_1$ and $V_2$ is shown in Equation 2 and the logarithmic relation between these voltages is shown in Equation 3. Inserting the relation of Equation 4 into the Equation 3 the following relation can be obtained.

$$\log \frac{V_2}{V_1} = - \frac{V_o}{V_R} \qquad (5)$$

That is, the logarithmic ratio between the voltages $V_1$ and $V_2$ is converted to the voltage ratio between $V_R$ and $V_O$. As clearly shown in the Equation 5, the values of the capacitor 14, the resistor 15 and the time $t_1$ are eliminated. This means that the conversion accuracy is not affected by any factor if the value C of the capacitor 14, the value R of the resistor 15 and the period of the pulse generated in the pulse generator 26 are held constant during the periods $T_0$, $T_1$, $T_2$, $T_3$ and $T_4$. As to this, it is very easy to hold these values constant during the very short time of one conversion and, therefore, the accuracies of the absolute values of the resistor R, the capacitor C and the period of the pulses are not necessary.

Then, by suitably selecting the value of the voltage $V_R$ the output voltage $V_O$ indicates the decible value itself. That is, from the Equation 5 the following relation can be obtained:

$$V_o = -V_R \log \frac{V_2}{V_1} \qquad (6)$$

Further, the Equation 6 becomes:

$$V_0 = -V_R \log 10 \log_{10} \frac{V_2}{V_1} \quad (7)$$

As log 10 = 2.3026, then selecting the value of $V_R$ as a reciprocal of log 10 that is:

$$V_R = \log_{10} e = 0.4343$$

the Equation 7 becomes:

$$V_0 = -\log_{10} \frac{V_2}{V_1} \quad (8)$$

By selecting the value of $V_R$ as mentioned above, the value of $V_0$ is easily dealt with, as the thus obtained logarithmic output $V_0$ can be converted to a digital value.

It should be clear from the explanation concerning FIG. 2, input and output of the signal from the comparator 21, the reversible counter 25 and the switch control circuit 24 is not limited to the example shown in FIG. 2. For example, the output of the comparator 21 can be applicable to the switch control circuit 24 at the same time that said output of the comparator 21 is supplied via the line 27 to the reversible counter 25. It is also possible that the output of the comparator 21 controls the switch control circuit 24 by connecting the line 27 from the output of the comparator to the switch control circuit 24 and the output of the switch control circuit 24 controls the reversible counter 25. Further, a hold circuit which holds the output voltage $V_0$ obtained on the output terminal 10 can be added.

Figure 3A:
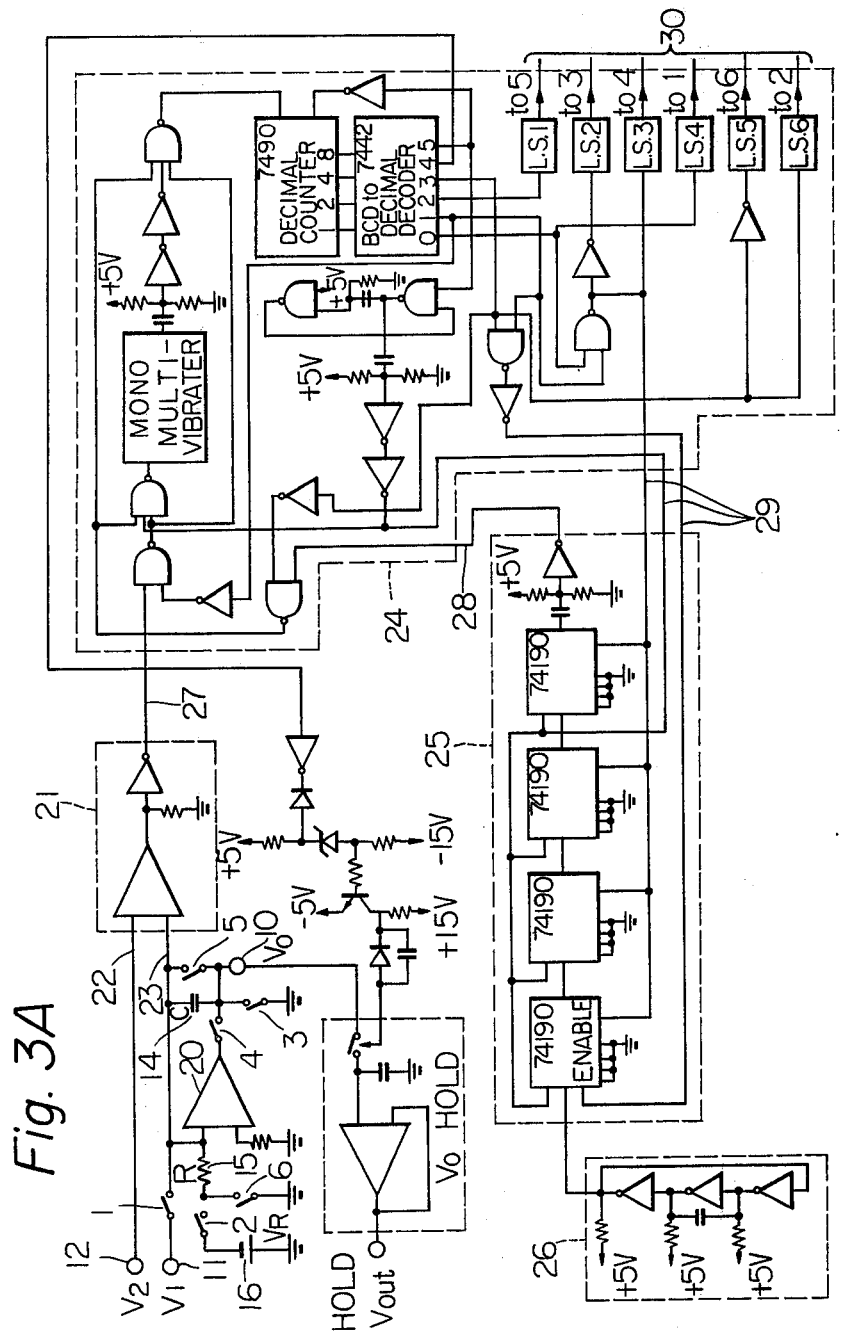
FIGS. 3A to 3D are detailed circuit diagrams of the block diagram of FIG. 2.
Figure 3B:
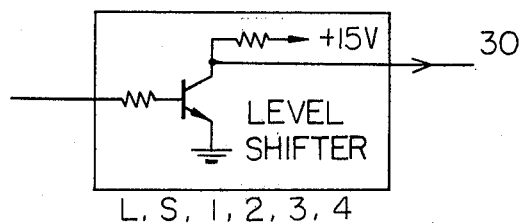
Figure 3C:
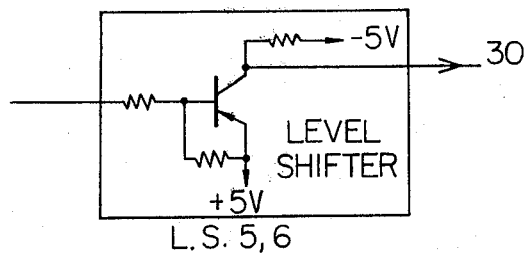
Figure 3D:
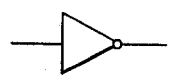
Figure 3E:

FIGS. 3A–3E are descriptive of one embodiment of the block diagram shown in FIG. 2. Reference numerals correspond to those of FIG. 2. Referring to FIG. 3A, the output of the comparator 21 is supplied via line 27 to the switch control circuit 24. And $V_0$ hold circuit which holds the output voltage $V_0$ obtained on the output terminal 10 is added. Referring to FIG. 3A, 74190, 7490 and 7442 indicate the type number of the integrated circuit which are manufactured by Texas Instrument Co. Ltd., in the U.S.A.

The ratio between voltages $V_R$ and $V_0$ can be obtained by using a well known dual slope type digital voltmeter [for example, Technical Report of the Institute of Electrical Engineers of Japan (Part II) No. 11, Committee of Digital Measuring Instruments of the Institute of Electrical Engineers of Japan, "Digital Electric Voltmeter" pages 30–37, published September, 1970].

Figures 4, 5:
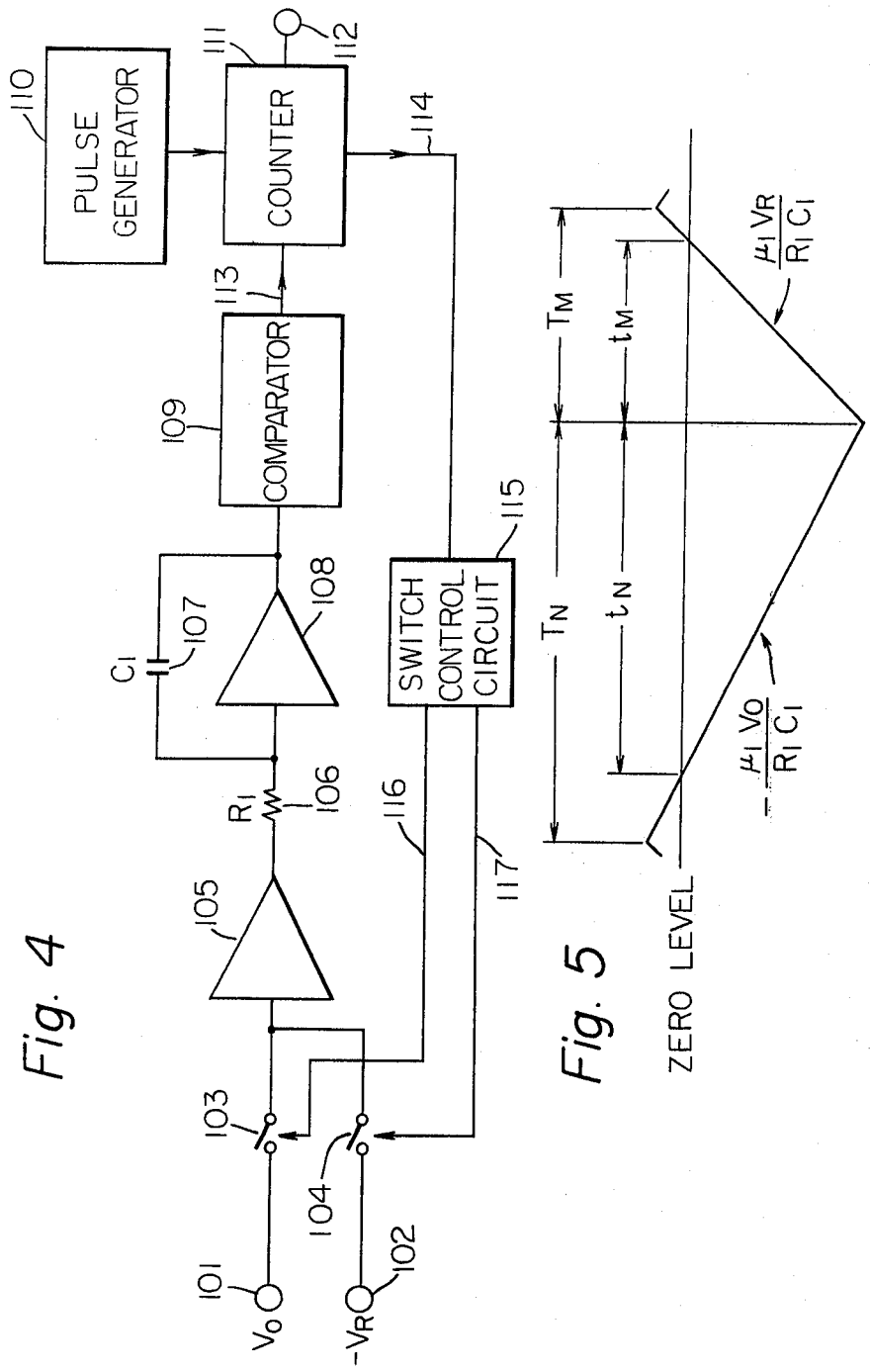
FIG. 4 is a block diagram of a digital voltmeter.
FIG. 5 is a diagram explaining the function of the digital voltmeter shown in FIG. 4.

FIG. 4 will now be explained. The voltages $V_0$ and $-V_R$ supplied to the input terminals 101 and 102 are respectively supplied via switches 103 and 104 to a preamplifier 105 having an amplification factor $\mu_1$. The output of the preamplifier 105 is supplied to an integrator which is composed of a resistor 106 having a value of resistance $R_1$, a capacitor 107 having a value of capacitance $C_1$ and an amplifier 108 having a sufficiently large amplification factor. The output of the above-mentioned integrator is applied via a comparator 109 to a counter 111. The output of a pulse generator 110 which generates pulses with constant period is applied to the counter 111 which counts said pulses. The output of the counter 111 is applied via a line 114 to a switch control circuit 115. The outputs 116 and 117 of the switch control circuit 115 respectively control the switches 103 and 104.

Referring to FIG. 4, the switch 103 is on and the switch 104 is off during the period $T_N$ as shown in Table 2.

Table 2

| SWITCH PERIOID | 103 | 104 |
|---|---|---|
| $T_N$ | ON | OFF |
| $T_M$ | OFF | ON |

Then the voltage having a waveform shown in FIG. 5 appears on the output terminal of the amplifier 108. When the output of the amplifier 105 intersects zero level, the comparator 109 sends a signal placing the counter in an operating condition so as to count the number of pulses generated by the pulse generator 110. When the number of the counted pulses reaches a predetermined number N, the output of the counter 111 is supplied via line 114 to the switch control circuit 115. The switch 103 becomes on and the switch 104 becomes off as shown in Table 2, and the period $T_M$ begins. Then the voltage $-V_R$ having a reverse polarity to the voltage $V_0$ and being supplied to the terminal 102 is integrated and intersects zero line again. The counter 111 counts M pulses during the period $T_M$ and the counted value M is obtained on the terminal 112. By the above-mentioned operation, the following equation is obtained from FIG. 5:

$$\frac{\mu_1 V_R}{R_1 C_1} t_M - \frac{\mu_1 V_0}{R_1 C_1} t_N = 0$$

that is:

$$\frac{V_0}{V_R} = \frac{t_M}{t_N} = \frac{M}{N} \quad (9)$$

From Equations 9 and 5, $$\frac{M}{N} = \log \frac{V_1}{V_2} \quad (10)$$

The Equation 10 becomes:

$$\frac{M}{N} = \log 10 \log_{10} \frac{V_1}{V_2} \quad (11)$$

When a suitable value of N is selected, the value M becomes the converted logarithmic value. For example, multiplying the equation (11) by $$20/\log 10 = 8.686$$

the Equation 11 becomes $$8.686 \frac{M}{N} = 20 \log_{10} \frac{V_1}{V_2} \quad (12)$$

By selecting N = 8686, that is, when the counter 111 counts 8686 of the pulses generated in the pulse generator 110 the period $t_N$ transfers to the period $t_M$, M indicates 0.001dB (voltage ratio or current ratio) per 1 count. If we select N = 869, M designates 0.01dB per 1 count.

Multiplying both sides of the Equation 11 by $10/\log 10 = 4.343$, the Equation 11 becomes:

$$4.343 \frac{M}{N} = 10 \log_{10} \frac{V_1}{V_2} \quad (13)$$

Referring to equation 13, when the value of N is selected as $N = 4343$, M designates 0.001dB (electrical power ratio) per 1 count. As a result of this, the counted value M is obtained on the terminal 112 as the output of the counter 111.

Another method for obtaining the relation $$\frac{V_o}{V_R} = \frac{M}{N}$$

can be realized by using the integrating digital voltmeter utilizing pulse width modulation [Technical Report of the Institute of Electrical Engineers of Japan (Part II) No. 11, Committee of Digital Measuring Instruments of the Institute of Electrical Engineers of Japan "Digital Electric Voltmeter" pages 34–38, published October, 1970] or the digital tester utilizing an analog to digital converter [Dempa Kagaku, Vol. 452, Ichiro Haga: "General View of VOAC 77 Fabricated in Iwatsu", pages 133–139, published by Japan Broadcast Publishing Company Ltd., April, 1971].

The digital voltmeter explained in FIGS. 4 and 5, the above-mentioned integrating digital voltmeter utilizing pulse modulation and the digital tester utilizing an analog to digital converter each include a pulse generator, a counter, a comparator etc., and these elements can be commonly used in the embodiments of the present invention.

Figure 6:
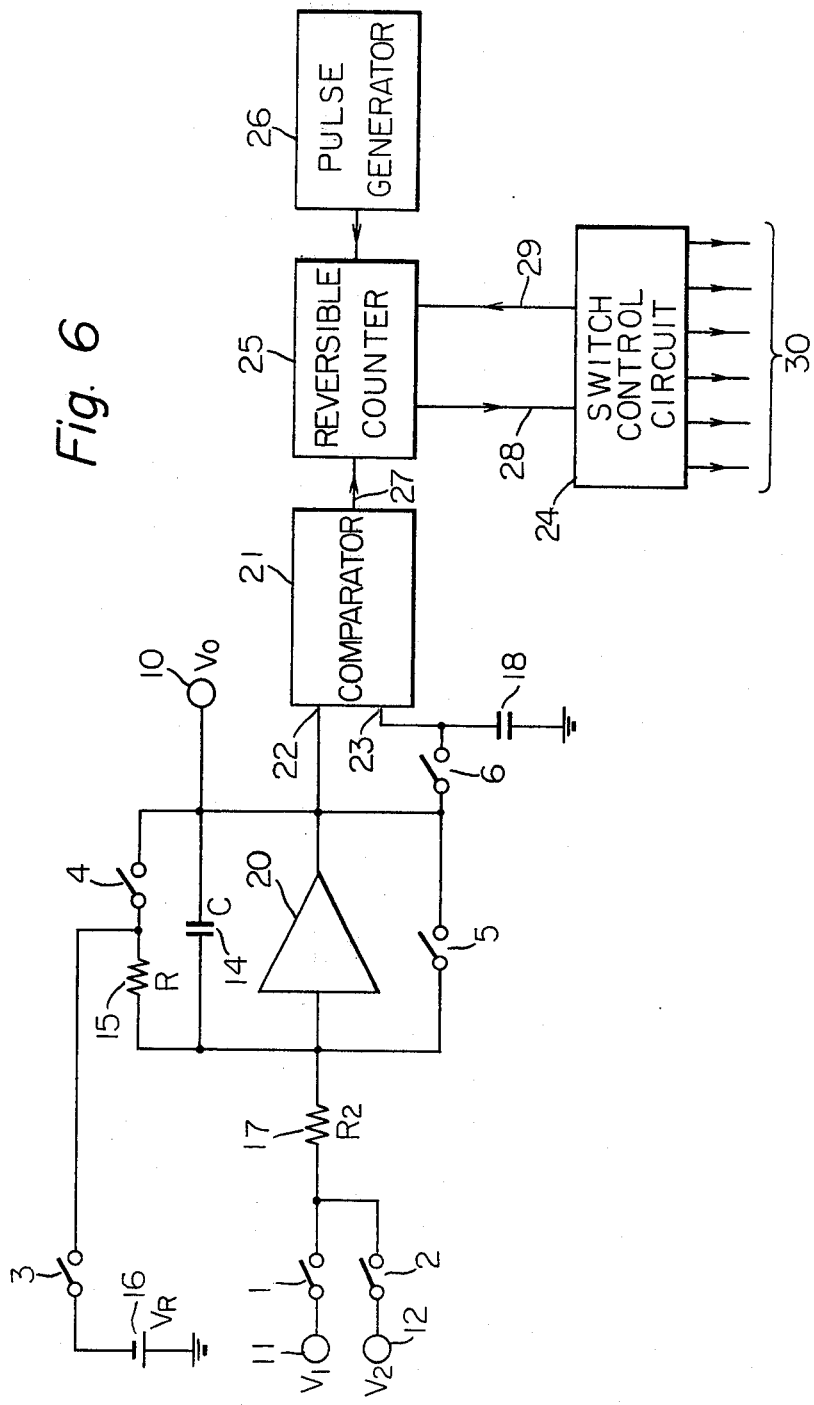
FIG. 6 is another embodiment of the method according to the present invention.

FIG. 6 is another embodiment of the present invention for obtaining the logarithmic output $V_O$. Referring to FIG. 6, 1–6 indicate switches, 17 is a resistor having a resistance value $R_2$, 18 is a capacitor, and the other reference numerals used are the same as those of FIG. 2.

Table 3

| SWITCH PERIOD | 1 | 2 | 3 | 4 | 5 | 6 |
|---|---|---|---|---|---|---|
| $T_a$ | OFF | ON | OFF | ON | OFF | ON |
| $T_0$ | ON | OFF | OFF | ON | OFF | OFF |
| $T_1$ | OFF | OFF | OFF | ON | OFF | OFF |
| $T_2$ | OFF | OFF | OFF | OFF | ON | OFF |
| $T_3$ | OFF | OFF | ON | OFF | OFF | OFF |
| $T_4$ | OFF | OFF | OFF | OFF | OFF | OFF |

As shown in Table 3, in the period $T_a$, switches 2, 4 and 6 are on and switches 1, 3 and 6 are off. Then the capacitor 18 is charged with the voltage $$-V_2 \frac{R}{R_2}$$

and this charged value is stored.

During the period $T_0$, switches 1 and 4 are on and switches 2, 3, 5 and 6 are off. Then the capacitor 14 is charged with the voltage.

$$-V_1 \frac{R}{R_2}$$

Next, during the period $T_1$, the switch 4 is on, and the other switches are off, the charge on the capacitor 14 is discharged by the resistor R as shown below, $$-V_1 \frac{R}{R_2} \epsilon^{-\frac{t}{RC}}$$

and this voltage is supplied to the input terminal 22 of the comparator 21. When this voltage intersects with the voltage applied to the input terminal 23 of the comparator 21, that is, the voltage $$-V_2 \frac{R}{R_2}$$

the comparator sends the output signal to the reversible counter 25. As a result of this, the following equation is obtained.

$$-V_1 \frac{R}{R_2} \epsilon^{-\frac{t_1}{RC}} = -V_2 \frac{R}{R_2}$$

Referring to the above equation, the time $t_1$ concerns, as in the case of FIG. 2, the time that the comparator 21 sends the output signal to the reversible counter 25. This time $t_1$ is memorized in the reversible counter 25.

Next, during the period $T_2$, the switch 5 is on, and the other switches 1, 2, 3, 4 and 6 are off. Then the charge on the capacitor 14 is discharged.

In the period $T_3$, the switch 3 is on and the other switches 1, 2, 4, 5 and 6 are off. In this period, similar to the case of FIG. 2, the output voltage $V_R$ of the electrical source 16 is integrated during the time $T_1$ by the operation of the reversible counter 25 and the pulse generator. Then the voltage $V_o$ shown in the Equation 4 is obtained on the output terminal 10.

In the above-mentioned state, the period $T_4$ begins, all switches 1–6 become off, and the voltage $V_o$ shown in Equation 4 is held on the output terminal 10.

In the example shown in FIG. 2 and FIG. 6, the reversible counter 25 is utilized for counting the time $t_1$, however, the counting means is not limited to the reversible counter. For example, two counters can be used, that is, the first counter counts the pulses during the period $T_1$, the second counter counts the pulses during the period $T_3$, and when the counted value by the second counter becomes equal to that of the first value, the period $T_3$ can be transferred to the period $T_4$.

In the Equation 4, we put the integration time as $t_1$. However, if this time is put as $kt_1(k>0)$, the Equation 4 becomes:

$$V_o = V_R \frac{kt_1}{RC} \quad (13)$$

If the Equation 13 is inserted into the Equation 3, the following equation, corresponding to the Equation 5, can be obtained.

$$\log \frac{V_2}{V_1} = -k \frac{V_o}{V_R} \quad (14)$$

Referring to FIGS. 2 and 6, the repetition frequency $f_3$ of the pulses which are supplied from the pulse generator 26 to the reversible counter 25 during the period $T_3$ can be selected as 2 times the frequency $f_1$ during the period $T_1$, that is $$f_3 = 2f_1$$

then the value of $k$ becomes $k = 0.5$. Or it is also easy to select $2f_3 = f_1$, that is, $k = 2$.

The reversible counter 25 is used in FIGS. 2 and 6. If we use one counter and one reversible counter, instead of the reversible counter 25 and the counter counts from 0 to $n$ during the period $T_1$, and the reversible counter counts from 0 to $n$ and from $n$ to 0 during the period $T_3$, the value of $k$ can be selected as $k = 2$.

Further, referring to the above explanation the voltages $V_1$ or $V_2$ can be commonly used as the voltage $V_R$ of the electrical power source 16.

As should be clear from the above explanation, according to the present invention, the variations of the values of the resistor and the capacitor, or the necessary condition for the accuracy of the time measurement, which were the causes of the errors can be completely removed and a high accuracy can be anticipated. Further, very low cost also can be attained and, therefore, the effects of the present invention are considerable.

Considerable effects can be anticipated by applying the present invention to the conventional level meter, that is, to the portion where an input alternate signal converts to a direct current signal and this converted direct current signal to the logarithmic value.

What is claimed is:

1. Circuit arrangement for converting a ratio of two input signals to a logarithmic value comprising a first input terminal to which a first input signal is supplied, a second input terminal to which a second input signal is supplied, a common terminal for said first and second input terminals, a capacitor adapted to be charged to a value proportional to said first signal, a first switch ($SW_1$) which is connected between said first input terminal and said capacitor, a discharging resistor which is connected to said capacitor for discharging said capacitor, a second switch ($SW_2$) which is connected between said first switch and said discharging switch, a third switch ($SW_3$) which is connected between said capacitor and ground, an amplifier whose input terminal is connected to a connection point of said resistor and said capacitor and whose output terminal is connected via a fourth switch ($SW_4$) to a connection point of said capacitor and said third switch, a fifth switch ($SW_5$) which is connected in parallel to said capacitor, a sixth switch ($SW_6$) which is connected between ground and a connection point of said second switch and said discharging resistor, an output terminal which is a connection point of said capacitor and said third switch, a comparator whose first input terminal is connected to said first switch, whose second terminal is connected to said second terminal and whose output terminal is connected to a reversible counter, a pulse generator which generates pulses with a predetermined constant period and is connected to said reversible counter, a switch control circuit which is connected to said reversible counter and controls said switches ($SW_1$–$SW_6$) in such a manner that:

| PERIOD | $SW_1$ | $SW_2$ | $SW_3$ | $SW_4$ | $SW_5$ | $SW_6$ |
|---|---|---|---|---|---|---|
| $T_0$ | ON  | OFF | ON  | OFF | OFF | ON  |
| $T_1$ | OFF | OFF | ON  | OFF | OFF | ON  |
| $T_2$ | OFF | OFF | OFF | ON  | ON  | ON  |
| $T_3$ | OFF | ON  | OFF | ON  | OFF | OFF |
| $T_4$ | OFF | OFF | OFF | ON  | OFF | ON  | a. when the discharging circuit begins to discharge said capacitor, said switch control circuit sends a signal to said reversible counter which thereupon begins to count forwardly the pulses sent by said pulse generator, b. when the voltages applied to said first and said second input terminals of said comparator reach an equal value, said comparator sends a signal to said reversible counter so as to stop said counter, said switch control means constituting a circuit integrating the voltage from said power supply source, and said reversible counter begins to count in reverse the pulses sent by said pulse generator, when the count by said reversible counter becomes zero, the output voltage of said capacitor is held and then the logarithmic value of the ratio between said second input signal and said first input signal is determined by the ratio between the output of said capacitor and said voltage from said electric power source.

2. Circuit arrangement for converting a ratio of two input signals to a logarithmic value comprising a first input terminal to which a first input signal is supplied, a second input terminal to which a second input signal is supplied, a common terminal for said first and second terminal, a first capacitor coupled to said first input terminal for charging to a value proportional to said first input signal, a second capacitor coupled to said second input terminal for charging to a value proportional to said second input signal, a discharging resistor for discharging said second capacitor, a first switch which is connected to said first input terminal, a second switch which is connected to said second input terminal, an integrating resistor which is connected between said first switch and said second capacitor and said charging resistor, a third switch connected between a source of electrical power and said resistor, a fourth switch connected between said resistor and said capacitor, an amplifier whose input terminal is connected to a connection point of said second capacitor and said resistor and whose output terminal is connected to a connection point of said second resistor and said fourth switch, a fifth switch which is connected between said input and output of said amplifier, a sixth switch which is connected between said fifth switch and said first capacitor, a comparator whose first input terminal is connected to said first capacitor, whose second terminal is connected to said second capacitor, and whose output terminal is connected to a reversible counter, a pulse generator which generates pulses with a predetermined constant period and is connected to said reversible counter, a switch control circuit which is connected to said reversible counter and controls said switches ($SW_1$–$SW_6$) in such a manner that:

| PERIOD | 1 | 2 | 3 | 4 | 5 | 6 |
|---|---|---|---|---|---|---|
| $T_0$ | OFF | ON | OFF | ON | OFF | ON |

-Continued

| PERIOD | 1 | 2 | 3 | 4 | 5 | 6 |
|---|---|---|---|---|---|---|
| $T_0$ | ON | OFF | OFF | ON | OFF | OFF |
| $T_1$ | OFF | OFF | OFF | ON | OFF | OFF |
| $T_2$ | OFF | OFF | OFF | OFF | ON | OFF |
| $T_3$ | OFF | OFF | ON | OFF | OFF | OFF |
| $T_4$ | OFF | OFF | OFF | OFF | OFF | OFF | a. when the discharging circuit begins to discharge said capacitor said switch control circuit sends a signal to said reversible counter and said reversible counter begins to count forwardly the pulses sent by said pulse generator, b. when the voltages applied to said first and said second input terminals of said comparator reach an equal value, said comparator sends a signal to said reversible counter so as to stop said counter, said switch control means constituting a circuit integrating the voltage from said power supply source, and said reversible counter begins to count in reverse the pulses sent by said pulse generator, when the count by said reversible counter becomes zero, the output voltage of said capacitor is held and then the logarithmic value of the ratio between said second input signal and said first input signal is determined by the ratio between the output of said capacitor and said voltage of said electric power source.

3. A system for converting a ratio of two input signals into a logarithmic value comprising the steps of:

a. charging a capacitor C to a voltage value proportional to the first input signal to be compared, b. discharging said capacitor C and comparing the voltage on said capacitor and the voltage proportional to said second input signal, c. counting constant frequency pulses from 0 to $n$ between the time of the beginning of the discharge of said capacitor and the time when said compared voltages are equal, d. then reversingly counting said pulses from $n$ to 0, and f. integrating a reference voltage from an electrical power source during the period when said pulses are reversely counted from $n$ to 0, thereby determining the logarithmic value of the ratio between said second and first input signals as the ratio between said integrated voltage and the voltage from said electrical power source.

4. A system for converting a ratio of two signals into a logarithmic value comprising the steps of:

a. beginning at the start of a given time interval the discharge of a circuit having a predetermined time constant, b. producing a series of pulses having a predetermined constant period, c. beginning the counting of said pulses at said start of said interval, d. comparing said two input signals until simultaneous equal amplitudes in both signals are detected, e. stopping the counting of said pulses at a number determined by said detection of said equal amplitudes, f. beginning the integration of a reference voltage when said counting stops, and g. counting said number of pulses from the beginning of said integration until said count is completed, whereupon an output signal corresponding to said integrated voltage and being representative of said logarithmic value is obtained.

* * * * *

UNITED STATES PATENT OFFICE
CERTIFICATE OF CORRECTION

PATENT NO. : 3,878,383
DATED : April 15, 1975
INVENTOR(S) : Kozo Uchida

It is certified that error appears in the above-identified patent and that said Letters Patent are hereby corrected as shown below:

Claim 1, line 12, delete "first switch and said discharging switch" and insert --discharging resistor and said common terminal--.

Claim 3, line 14, change "f." to --e.--

Signed and Sealed this twenty-fifth Day of November 1975

[SEAL]

Attest:

RUTH C. MASON
Attesting Officer

C. MARSHALL DANN
Commissioner of Patents and Trademarks